April 8, 1969  P. KAPTEYN ET AL  3,437,021
PHOTOGRAPHIC CAMERA INCLUDING AN ELECTRONIC FLASH DEVICE
Filed Nov. 24, 1965

Inventors:
Paul Kapteyn
Walter Gunz

United States Patent Office 3,437,021
Patented Apr. 8, 1969

3,437,021
PHOTOGRAPHIC CAMERA INCLUDING AN ELECTRONIC FLASH DEVICE
Paul Kapteyn, Am Pfarracker 15, and Walter Schmidt, Luzerner Strasse 19, both of 1 Berlin 45, Germany
Filed Nov. 24, 1965, Ser. No. 524,629
Claims priority, application Germany, Nov. 26, 1964, L 38,481
Int. Cl. G03b 19/04, 9/70
U.S. Cl. 95—11                2 Claims

ABSTRACT OF THE DISCLOSURE

A photographic camera having a basic camera part, a first housing part detachably connected to the upper part of the basic camera part and forming the upper cap of the basic camera part, and a second housing part detachably connected to the lower end of the basic camera part. Both of the housing parts contain the electric components necessary for producing an electronic flash. The first detachable housing part contains a plurality of the components for the electronic flash device and the second detachable housing on the other side contains the remainder of the components for the electronic flash device. The first housing may be selectively replaced by another housing part having the form of a camera cap of the same size and shape as the first housing part omitting the electronic flash elements, and containing only those components necessary to change the basic camera part as to form a conventional camera without an electronic flash generating device wherein the second additional housing part may be omitted.

---

The invention relates to photographic cameras which are fitted with an electronic flash device. Such arrangements are already generally known and represent the combination of a camera with an electronic flash device.

The aim of the invention is to provide a variation of such cameras combined with flash devices in that the basic casing of the photographic camera can be combined selectively with various accessories, more particularly with an electronic flash device, exposure meter and/or range finder or the like. The photographic camera with electronic flash device in accordance with the invention is characterized in that on the basic body casing of the camera above and/or below additional caps can be selectively fitted which correspond to the shape of the basic casing of the camera and accommodate components of an electronic flash device, exposure meter, range finder or the like requisite for the operation of the camera, to wit either singly or in various combinations or all together.

In accordance with the invention therefore there is a basic camera-body casing on which additional caps with the components named can be selectively fitted. The invention therefore enables the camera to be converted by means of the various selectively attachable cap portions from an ordinary camera into a camera with a multitude of additional devices. Thus e.g. the additional upper cap portion may accommodate merely a view finder aperture for the view finder attached to the basic body of the camera, and the attachment of such simple upper cap portion converts the camera into an ordinary camera fitted only with a view finder. A lower cap portion fitted underneath the camera casing is therefore not incorporated.

On the other hand the additional upper cap portion can in accordance with the invention accommodate both the view finder aperture and also a range finder and/or exposure measuring device. This would create a camera containing in the range finder and exposure meter additional devices which facilitate operation of the camera.

Further, however, the additional upper cap portion can accommodate besides the view finder, range finder and/or exposure meter parts of an electronic flash device, preferably the reflector with the flash lamp and the ignition arrangement, so that the camera is now also converted into a highly convenient photographic camera through the incorporation of an electronic flash device. In this case where an electronic flash device is simultaneously incorporated the space in the upper cap would not suffice for the additional parts of the electronic flash device, so that in accordance with the invention the remaining controls and the power source for the electronic flash device are accommodated in the attachable lower cap portion.

Figure 1A:
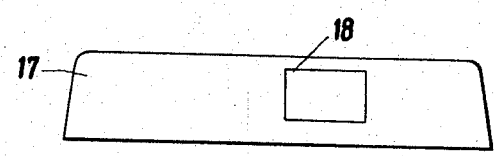
Figure 1B:
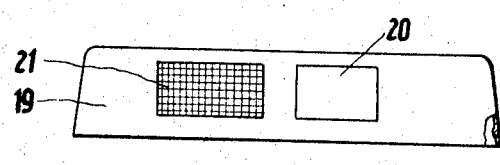
Figure 1:
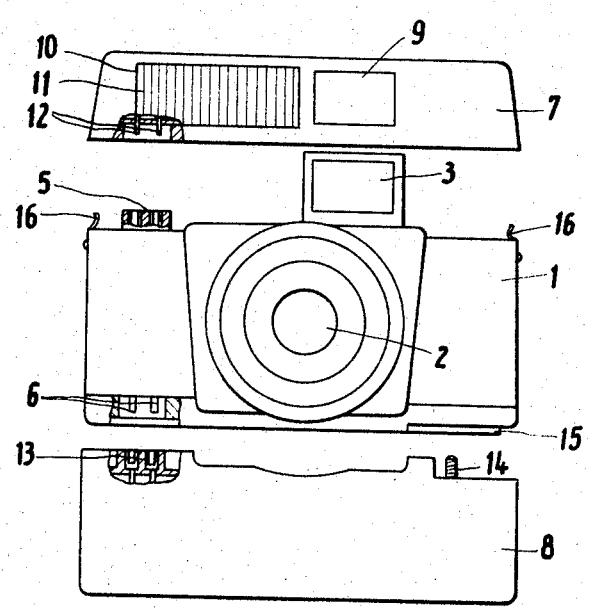

In the accompanying drawing details are now explained by way of exemplary embodiments. In these drawings show:

FIG. 1 a photographic camera with detachable upper and lower portions containing an additional electronic flash arrangement, FIG. 1a a further embodiment of the invention in which the upper cap shows the simplest form of design, viz. contains merely the view finder aperture for the camera view finder. The camera fitted with this cap therefore represents the simplest design of a photographic camera, the lower housing part being omitted.

FIG. 1b shows another embodiment for the cap attachable to the basic camera casing, in which the upper cap accommodates both the view finder aperture and an exposure meter.

Figure 2:
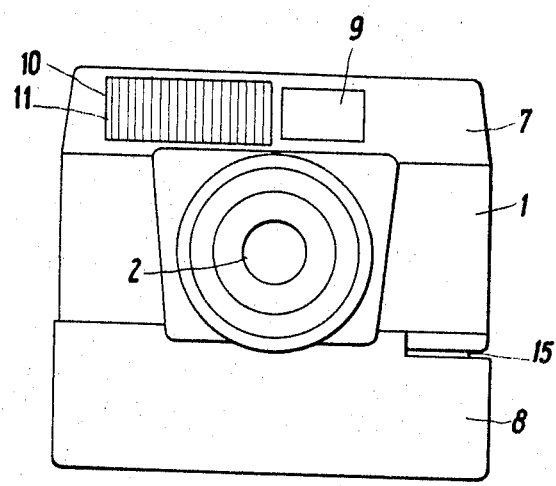

FIG. 2 reveals the front view of a camera as assembled unit consisting of the first and second housing parts attached to the basic camera part as shown in FIG. 1, viz. the camera with view finder arrangement and electronic flash arrangement in the upper cap and the additional elements of the electronic flash device in the lower cap, which is attached to the basic camera casing.

In FIG. 1, 1 is the basic camera-body casing with the photographic lens 2, the view finder arrangement 3 and the connecting elements 5 and 6 for the detachable upper and lower cap portions 7 and 8. The upper cap 7, which is detachable from the basic camera casing 1, accommodates apart from the view finder aperture 9 portions of an electronic flash device, more particularly the reflector 10, whose aperture is covered from the outside by a mask pane 11 in the known manner. In this reflector the flash lamp is accommodated in a known manner and further in the upper cap portion 7 further parts of the electronic flash device are simultaneously accommodated, e.g. the ignition arrangement and/or the ignition controls. On attaching this upper cap 7 to the basic camera casing 1 the electric connection to the plug socket 5 fitted to the casing 1 is made over plug contact 12. From the plug socket electric leads, for convenience not shown, pass through the casing 1 to the lower plug elements 6 on casing 1.

From below a lower casing cap 8 is now attachable to basic casing 1, to wit by means of plug socket 13, which is connected to the associated plug elements 6. Screw 14 is a further means of fastening between lower cap portion 8 and casing 1. This fastening screw 14 can be screwed from below through portion 8 into part 1. A front view of the assembled camera with these upper and lower portions 7 and 8 is shown in FIG. 2. The reference numbers given here are the same as for the parts in FIG. 1. 15 indicates the well known film feed lever. 16 designates the springs which clamp upper portion 7 firmly to the basic camera casing (see FIG. 1).

FIG. 1a represents another exemplary embodiment of the camera, e.g. of a camera of the simplest kind. In this, 17 is the upper cap attachable to the basic camera casing 1, which cap merely accommodates an aperture 18 for the view finder arrangement 3 provided on the basic casing 1. This is therefore a camera design of the simplest kind without electronic flash device and without exposure meter. The lower cap portion 8 shown in FIG. 1 would be absent in this design.

In accordance with FIG. 1b, showing a further exemplary embodiment of the invention, the upper cap 19 attachable to basic casing 1 contains besides the view finder aperture 20 also an exposure meter arrangement 21, as well known. This cap 19 replaces upper cap 7 shown in FIG. 1, thus allowing the creation of a camera with view finder and exposure meter arrangement. An electronic flash device is not provided in this embodiment. 22 is e.g. a catch in which spring 16 at the basic camera casing 1 (see FIG. 1) is fitted. On the opposite side of cap 19 such a catch can of course also be fitted in which a second spring 16 can engage. Caps 7 and 17 can also be provided with such catches.

The advantage of the invention is obvious. It consists in the fact that by simply exchanging upper and/or lower portions the basic camera body can be converted into a camera with various accessory arrangements. Thus the invention can be applied to convert a camera of the simplest design by attaching or plugging in another upper cap portion and another additional lower cap portion into a camera with built-in electronic flash device.

The buyer of the simple camera design is thus enabled to extend the simply designed camera into a camera with a number of accessory arrangements merely by subsequently buying additional cap portions.

What is claimed is:

1. A photographic camera comprising a basic camera part, a first housing part detachably connected to the upper part of said basic camera part, a second additional housing part, detachably connected to the lower end of said basic camera part, said first and second housing parts containing the electrical components necessary for producing an electronic flash and means for connecting mechanically and electrically said basic camera part and both said additional housing parts, said basic camera part carrying on its upper side a view-finder arrangement rigidly connected to said camera part, said first housing part containing a flash reflector and said means for connecting mechanically and electrically said first housing part with said basic camera part and said second housing part respectively, said first housing part being further supplied with a view-finder aperture thus arranged on this first housing part as to be adapted to cooperate with said view-finder arrangement on said basic camera part, said first housing part being further selectively exchangeable with another housing part of the same shape and size omitting said flash reflector and containing instead of said latter an exposure meter arrangement together with said means for connecting said housing part with said basic camera part and further containing a view-finder aperture thus arranged on this housing part as to be adapted to cooperate with said view-finder arrangement on said basic camera part.

2. A photographic camera comprising a basic camera part, a first housing part detachably connected to the upper part of said basic camera part, a second additional housing part detachably connected to the lower end of said basic camera part, said first and second housing parts containing the electrical components necessary for producing an electronic flash and means for connecting mechanically and electrically said basic camera part and both additional housing parts, said basic camera part carrying on its upper side a view-finder arrangement rigidly connected to said camera part, said first housing part containing a flash reflector and said means for connecting mechanically and electrically said first housing part with said basic camera part and said second housing part respectively, said first housing part being further supplied with a view-finder aperture thus arranged on this first housing part as to be adapted to cooperate with said view-finder arrangement on said basic camera part, said first housing part being further selectively exchangeable with another housing part of the same shape and size omitting said flash reflector and said means for its electrical connection with said basic part and containing only a view-finder aperture thus arranged on this housing part as to be adapted to cooperate with said view-finder arrangement on said basic camera part, said second additional housing part then being omitted.

References Cited
UNITED STATES PATENTS

| | | | |
|---|---|---|---|
| 3,134,547 | 5/1964 | Kapteyn et al. | 95—11.5 XR |
| 3,172,345 | 3/1965 | Jakob et al. | 95—11 |
| 3,358,573 | 12/1967 | Bihlmaier | 95—11 |

NORTON ANSHER, *Primary Examiner.*

F. L. BRAUN, *Assistant Examiner.*